US008619774B2

(12) United States Patent
Nalawade

(10) Patent No.: US 8,619,774 B2
(45) Date of Patent: Dec. 31, 2013

(54) METHOD AND APPARATUS FOR PROVIDING MULTICAST MESSAGES WITHIN A VIRTUAL PRIVATE NETWORK ACROSS A DATA COMMUNICATION NETWORK

(75) Inventor: Gargi Nalawade, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1714 days.

(21) Appl. No.: 10/974,419

(22) Filed: Oct. 26, 2004

(65) Prior Publication Data

US 2006/0088031 A1 Apr. 27, 2006

(51) Int. Cl.
*H04L 12/56* (2011.01)

(52) U.S. Cl.
USPC .......................................... 370/390; 370/409

(58) Field of Classification Search
USPC .......... 370/390, 422, 389, 392; 709/232, 238, 709/244
See application file for complete search history.

(56) References Cited

U.S. PATENT DOCUMENTS

| 6,078,590 | A | 6/2000 | Farinacci et al. |
| 6,147,970 | A | 11/2000 | Troxel |
| 6,185,210 | B1 | 2/2001 | Troxel |
| 6,339,595 | B1 | 1/2002 | Rekhter et al. |
| 6,385,647 | B1 | 5/2002 | Willis et al. |
| 6,415,323 | B1 | 7/2002 | McCanne et al. |
| 6,473,421 | B1 | 10/2002 | Tappan |
| 6,483,832 | B1 * | 11/2002 | Civanlar et al. ............... 370/390 |
| 6,484,257 | B1 | 11/2002 | Ellis |
| 6,526,056 | B1 | 2/2003 | Rekhter et al. |
| 6,584,082 | B1 | 6/2003 | Willis et al. |
| 6,625,773 | B1 * | 9/2003 | Boivie et al. .................. 714/749 |
| 6,633,835 | B1 | 10/2003 | Moran et al. |
| 6,636,895 | B1 | 10/2003 | Li et al. |
| 6,654,796 | B1 | 11/2003 | Slater et al. |
| 6,701,361 | B1 | 3/2004 | Meier |
| 6,721,315 | B1 | 4/2004 | Xiong et al. |
| 6,732,189 | B1 | 5/2004 | Novaes |
| 6,735,200 | B1 | 5/2004 | Novaes |
| 6,791,981 | B1 | 9/2004 | Novaes |
| 6,801,940 | B1 | 10/2004 | Moran et al. |
| 6,804,492 | B2 | 10/2004 | Kay |
| 6,810,417 | B2 * | 10/2004 | Lee ............................. 709/220 |
| 6,839,348 | B2 * | 1/2005 | Tang et al. .................... 370/390 |
| 6,973,057 | B1 | 12/2005 | Forslow |
| 7,082,140 | B1 | 7/2006 | Hass |
| 7,120,165 | B2 | 10/2006 | Kasvand-Harris et al. |
| 7,139,278 | B2 * | 11/2006 | Gibson et al. ................ 370/401 |
| 7,158,497 | B2 * | 1/2007 | Li et al. ........................ 370/331 |

(Continued)

OTHER PUBLICATIONS

Cisco Technology, Inc., "MPLS Virtual Private Networks," Cisco IOS Release 12.0(5)T, pp. 1-50.

(Continued)

*Primary Examiner* — Chi Pham
*Assistant Examiner* — Mohammad Adhami
(74) *Attorney, Agent, or Firm* — Hickman Palermo Truong Becker Bingham Wong LLP

(57) ABSTRACT

A method and apparatus for providing multicast messages across a data communication network, the method comprising the computer-implemented steps of: receiving a multicast join message; adding to the multicast join message a next hop and an address of a router to which the multicast message is to be sent; forwarding the multicast message based on the next hop address.

14 Claims, 7 Drawing Sheets

(56) References Cited

U.S. PATENT DOCUMENTS

| | | | |
|---|---|---|---|
| 7,281,058 B1 * | 10/2007 | Shepherd et al. | 709/238 |
| 7,484,003 B2 * | 1/2009 | Chandra et al. | 709/242 |
| 7,570,605 B1 * | 8/2009 | Aggarwal et al. | 370/256 |
| 7,856,509 B1 * | 12/2010 | Kodeboyina | 709/238 |
| 8,078,758 B1 * | 12/2011 | Callon | 709/242 |
| 2001/0024443 A1 | 9/2001 | Alriksson et al. | |
| 2002/0004843 A1 | 1/2002 | Andersson et al. | |
| 2002/0012320 A1 | 1/2002 | Ogier | |
| 2002/0023164 A1 | 2/2002 | Lahr | |
| 2002/0031107 A1 | 3/2002 | Li et al. | |
| 2002/0046287 A1 | 4/2002 | La Porta et al. | |
| 2002/0062388 A1 | 5/2002 | Ogier et al. | |
| 2002/0067725 A1 * | 6/2002 | Oguchi et al. | 370/390 |
| 2002/0075807 A1 | 6/2002 | Troxel et al. | |
| 2002/0075866 A1 | 6/2002 | Troxel et al. | |
| 2002/0078127 A1 | 6/2002 | Troxel et al. | |
| 2002/0078238 A1 | 6/2002 | Troxel et al. | |
| 2002/0085498 A1 | 7/2002 | Nakamichi et al. | |
| 2002/0147011 A1 | 10/2002 | Kay | |
| 2002/0172155 A1 | 11/2002 | Kasvand-Harris et al. | |
| 2002/0184368 A1 | 12/2002 | Wang | |
| 2003/0037109 A1 | 2/2003 | Newman et al. | |
| 2003/0048790 A1 | 3/2003 | McAllister et al. | |
| 2003/0051048 A1 | 3/2003 | Watson et al. | |
| 2003/0053457 A1 | 3/2003 | Fox et al. | |
| 2003/0063608 A1 | 4/2003 | Moonen | |
| 2003/0067928 A1 | 4/2003 | Gonda | |
| 2003/0074584 A1 | 4/2003 | Ellis | |
| 2003/0105865 A1 | 6/2003 | McCanne et al. | |
| 2003/0110288 A1 | 6/2003 | Ramanujan et al. | |
| 2003/0147405 A1 | 8/2003 | Khill | |
| 2003/0152063 A1 | 8/2003 | Giese et al. | |
| 2003/0165140 A1 | 9/2003 | Tang et al. | |
| 2003/0172145 A1 | 9/2003 | Nguyen | |
| 2003/0174706 A1 | 9/2003 | Shankar et al. | |
| 2003/0179742 A1 | 9/2003 | Ogier et al. | |
| 2003/0200307 A1 | 10/2003 | Raju et al. | |
| 2003/0212821 A1 | 11/2003 | Gillies et al. | |
| 2004/0025018 A1 | 2/2004 | Haas et al. | |
| 2004/0037279 A1 | 2/2004 | Zelig et al. | |
| 2004/0039839 A1 * | 2/2004 | Kalyanaraman et al. | 709/238 |
| 2004/0054799 A1 | 3/2004 | Meier et al. | |
| 2004/0062267 A1 | 4/2004 | Minami et al. | |
| 2004/0081154 A1 * | 4/2004 | Kouvelas | 370/392 |
| 2004/0103282 A1 | 5/2004 | Meier et al. | |
| 2004/0133619 A1 | 7/2004 | Zelig et al. | |
| 2004/0165600 A1 | 8/2004 | Lee | |
| 2004/0205215 A1 | 10/2004 | Kouvelas et al. | |
| 2005/0108419 A1 * | 5/2005 | Eubanks | 709/232 |
| 2006/0147204 A1 | 7/2006 | Yasukawa et al. | |
| 2009/0086644 A1 * | 4/2009 | Kompella et al. | 370/248 |

OTHER PUBLICATIONS

Cisco Technology, Inc. "IP Multicast Technology Overview," DIG: Enterprise Campus Technology, Apr. 18, 2002, pp. 3-26.

* cited by examiner

METHOD AND APPARATUS FOR PROVIDING MULTICAST MESSAGES WITHIN A VIRTUAL PRIVATE NETWORK ACROSS A DATA COMMUNICATION NETWORK

FIELD OF THE INVENTION

The present invention generally relates to data communication networks. The invention relates more specifically to a method and apparatus for providing multicast messages within a virtual private network across a data communication network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In computer networks such as the Internet packets of data are sent from a source to a destination via a network of elements including links (communication paths such as telephone or optical lines) and nodes (usually routers directing the packet along one or more of a plurality of links connected to it) according to one of various routing protocols, including internet protocol (IP).

Each node on the network advertises, throughout the network, links to neighboring nodes and provides a cost associated with each link, which can be based on any appropriate metric such as link bandwidth or delay and is typically expressed as an integer value. A link may have an asymmetric cost, that is, the cost in the direction AB along a link may be different from the cost in a direction BA. Based on the advertised information each node constructs a link state database (LSDB), which is a map of the entire network topology and from that constructs generally a single optimum route to each available node based on an appropriate algorithm such as, for example, a shortest path first (SPF) algorithm. As a result a "spanning tree" is constructed, rooted at the node and showing an optimum path including intermediate nodes to each available destination node. Because each node has a common LSDB (other than when advertised changes are propagating around the network) any node is able to compute the spanning tree rooted at any other node. The results of the SPF are stored in a routing information base (RIB) and based on these results the forwarding information base (FIB) or forwarding table is updated to control forwarding of packets appropriately. When there is a network change information representing the change is flooded through the network, each node sending it to each adjacent node.

IP Multicast is a bandwidth-conserving technology that reduces traffic by simultaneously delivering a single stream of information from a source to a plurality of receiving devices, for instance to thousands of corporate recipients and homes. Examples of applications that take advantage of multicast technologies include video conferencing, corporate communications, distance learning, and distribution of software, stock quotes and news. IP multicast delivers source traffic to multiple receivers without burdening the source or the receivers while using a minimum of network bandwidth. Multicast packets are replicated in the network at the point where paths diverge by routers enabled with Protocol Independent Multicast (PIM) and other supporting multicast protocols, resulting in efficient delivery of data to multiple receivers. The routers use Protocol Independent Multicast (PIM) to dynamically create a multicast distribution tree.

This can be understood by referring to FIG. 1 which depicts an illustrative network diagram showing a conventional technique for providing multicast messages. Receivers 2 within a designated multicast group 3 are interested in receiving a data stream (for instance video) from a source 4. The receivers 2 indicate their interest by sending an Internet Group Management Protocol (IGMP) host report to the routers 6 in the network 8. The routers 6 are then responsible for delivering the data from the source 4 to the receivers 2.

FIG. 2 is a diagram illustrating a Virtual Private Network (VPN). The VPN comprises a number of VPNs, 10, 11, 12 connected together via a single Autonomous System (AS), service provider backbone network 13. Each VPN may relate to a single site, as is the case with the VPNs indicated by numerals 10 and 12, or a plurality of sites as is the case with the VPN indicated by the numeral 11. Each VPN includes a customer edge (CE) device 14. Customer devices (not shown) are attached to the CE routers 14. The VPNs 10, 11, 12 are connected together via a service provider backbone 13. The service provider backbone 13 includes provider edge (PE) routers 16 which are connected to the CE routers 14. The service provider backbone network 13 also comprises a plurality of P routers 18 which route data from one PE 16 to another. Thus customer devices connected to the CE routers 14 use the VPNs to exchange information between devices. Only the PE routers 16 are aware of the VPNs 10, 11, 12.

Each VPN is associated with one or more VPN routing/forwarding instances (VRFs). A VRF defines the VPN membership of a customer site attached to a PE router. A VRF consists of an IP routing table, a derived forwarding table, a set of indicators that uses the forwarding table, and a set of rules and routing protocol parameters that control the information that is included in the routing table.

A service provider edge (PE) router 16 can learn an IP prefix from a customer edge router 14 by static configuration, through a BGP session with a CE router or through a routing information protocol (RIP) exchange with the CE router 14.

A Route Distinguisher (RD) is an 8-byte value that is concatenated with an IPv4 prefix to create a unique VPN IPv4 prefix. The IP prefix is a member of the IPv4 address family. After it learns the IP prefix, the PE converts it into a VPN-IPv4 prefix by combining it with an 8-byte route distinguisher (RD). The generated prefix is a member of the VPN-IPv4 address family. It serves to uniquely identify the customer address, even if the customer site is using globally non-unique (unregistered private) IP addresses. The route distinguisher used to generate the VPN-IPv4 prefix is specified by a configuration command associated with the VRF on the PE router.

Border Gateway Protocol (BGP) distributes reachability information for prefixes for each VPN. BGP communication takes place at two levels: within IP domains, known as autonomous systems (interior BGP or IBGP) and between autonomous systems (external BGP or EBGP). PE-PE or PE-RR (route reflector) sessions are IBGP sessions, and PE-CE sessions are EBGP sessions.

BGP propagates reachability information for VPN-IPv4 prefixes among PE routers 16 by means of BGP multiprotocol extensions (for example see RFC 2283, Multiprotocol Extensions for BGP-4) which define support for address families other than IPv4. It does this in a way that ensures the routes for a given VPN are learned only by other members of that VPN, enabling members of the VPN to communicate with each other.

Based on routing information stored in the VRF IP routing table and forwarding tables, packets are forwarded to their destination using multi-protocol label switching (MPLS). A PE router binds the label to each customer prefix learnt from the CE router 14 and includes the label in the network reachability information for the prefix that advertises to other PE routers. When a PE router 16 forwards a packet received from a CE router 14 across the provider network 13, it labels the packet with a label (an example of which is a PIM join) learned from the destination PE router. When the destination PE router 16 receives a label packet it pops the label and uses it to direct the packet to the correct CE router. Label forwarding across the provider backbone is based on either dynamic label switching or traffic engineered paths. A customer packet carries two levels of labels when traversing the backbone: a top label which directs the packet to the correct PE router and a second label which indicates how that PE router should forward the packets to the CE router.

Multicast Virtual Private Networks (MVPN) have been devised to provide a user with the ability to send multicast packets over VPNs. To achieve this, MVPN uses a Multicast GRE Tunnel to forward packets across a provider network. Customers can use the MVPN service from a provider to connect office locations as if they were virtually one network. The GRE Tunnel, also known as a Multicast Distribution Tunnel (MDT), is built across the provider network and spans a single BGP Autonomous System (AS).

However, it would be beneficial for the MDT to be spanned over multiple autonomous systems since many customers have an internal network that is split into multiple autonomous systems or have VPN sites that are connected to multiple service providers. This means that service providers, who may be competitors, would need to provide their internal IP address to each other to make the MDT reachable. The MDT is built between two Provider Edge (PE) routers, and other routers in between the PE routers need a way to select the reverse path forwarding (RPF) interface towards the other PE of the other AS or VPN. However service providers are unwilling to make their PE routers reachable via unicast for security reasons and therefore do not want to redistribute the PE information into other (competitor) domains.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for providing multicast messages for a virtual private network across a data communication network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural and Functional Overview
   3.0 Method of providing multicast messages across a data communication network
   4.0 Implementation Mechanisms—Hardware Overview
   5.0 Extensions and Alternatives 1.0 General Overview The needs identified in the foregoing Background, and other needs and objects that will become apparent for the following description, are achieved in the present invention, which comprises, in one aspect, a method for providing multicast messages for a virtual private network across a data communication network, the method comprising the computer-implemented steps of: receiving a multicast join message; adding to the multicast join message a next hop and address of a router to which the multicast message is to be sent; and forwarding the multicast message based on the next hop address.

This is repeated as necessary until the multicast message is received by the final address at which point the multicast message is forwarded to the address indicated in the original multicast message.

In other aspects, the invention encompasses a computer apparatus and a computer-readable medium configured to carry out the foregoing steps.

2.0 Structural and Functional Overview

Figure 3:
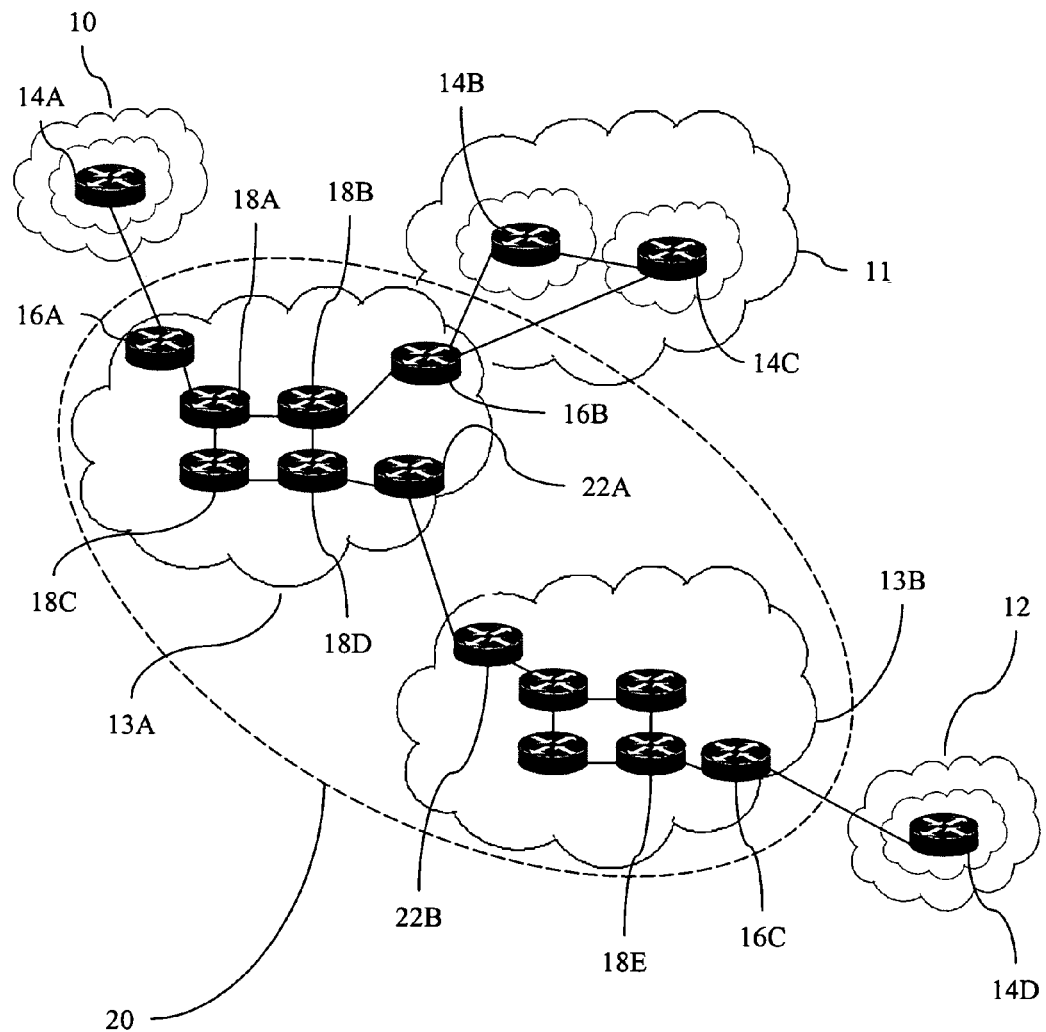
FIG. 3 is a diagram illustrating a first embodiment of a network.

FIG. 3 is a block diagram illustrating a first embodiment of a MVPN (Multicast Virtual Private Network). The MVPN comprises a service provider network 20, which comprises more than one Autonomous System (AS). The network illustrated in FIG. 3 comprises two autonomous systems indicated by reference numerals 13A and 13B. These Autonomous Systems may be service provider networks provided by, for instance, competitor internet service providers. Attached to the service provider network 20 are Customer Edge (CE) devices 14. Customer Edge devices are devices that are part of a customer's private network and are the device, typically a router, that interfaces to a router external to a customer's private network. In this context, "customer" refers to a first entity that has a customer relationship with a second entity that owns or operates service provider network 20. A description of a service provider network and customer elements is provided merely as one clear example. However, in alternative embodiments the approaches described herein are applicable to any network context regardless of whether a service provider or customer is present.

Each Autonomous System 13 comprises a Provider Edge (PE) router 16 that interfaces to a Customer Edge router 14. The PE router is then attached to one or more Provider (P)

routers 18. FIG. 3 only shows a few provider routers 18 in each Autonomous System 13. However, it will be clear to the person skilled in the art that an Autonomous System typically comprises many Provider (P) routers 18 and Provider Edge (PE) routers 16.

Each Autonomous System 13 also comprises an Autonomous System Boundary Router (ASBR) 22. An ASBR router is located on the border of an Autonomous System that connects the Autonomous System to a backbone network. These routers are considered members of both the backbone and the attached Autonomous System. PIM uses the ABSR to discover and announce RP-set information for each group prefix to all the routers in a PIM domain. They therefore maintain routing tables describing both the backbone topology and the topology of the associated Autonomous System.

Thus, in the arrangement shown in FIG. 3, a provider may provide network connectivity to its customers over a single infrastructure, the provider network 20. In the embodiment shown in FIG. 3, the provider network 20 spans more than one Autonomous System 13. Although only two Autonomous Systems are shown, it will be clear to a person skilled in the art that the provider network 20 may comprise two or more Autonomous Systems and that each Autonomous System may include a plurality of PE routers 16, provider routers 18 and AS boundary routers 22. In addition, FIG. 3 for simplicity only shows one or two CE devices 14 attached to each Autonomous System. However, it will be clear to a person skilled in the art that a customer may have many more CE devices attached.

To enable Multicast communication, end nodes (for instance CE devices 14) inform the adjacent PE router 16 of the network layer Multicast addresses they wish to receive. This may be done using Internet Group Management Protocol (IGMP). Routers then use a technique (such as Protocol Independent Multicast) PIM to build a tree for the route. The PE routers 16 typically use a reverse path forwarding technique which is an optimized form of flooding. In reverse path forwarding a node accepts a packet from source S via interface N only if N is the interface you would forward to in order to reach S. This reduces the overhead of flooding considerably. Because a router accepts the packet only from one interface, it floods it only once. Thus, in the example shown in FIG. 3, consider when a source, for instance the CE router 14A of VPN 10, sends out a Multicast message. This message is flooded through the Multicast group which we will consider as being all the CE devices shown in FIG. 3. Thus the Multicast message is received by PE router 16A and forwarded to P router 18A. The P router 18A then forwards it to routers 18B and 18C. Router 18C then forwards it to router 18D which in turn forwards it to router 18B. Router 18B therefore receives two copies of the Multicast message. In a reverse path forwarding system, P router 18B accepts the packet from the router 18A or 18D which is the interface that router 18B would use to forward to in order to reach the source 14 in VPN 10. Router 18B then forwards the message on to PE router 16B which then forwards the message on to the CE devices 14 in VPN 11.

Figure 4:
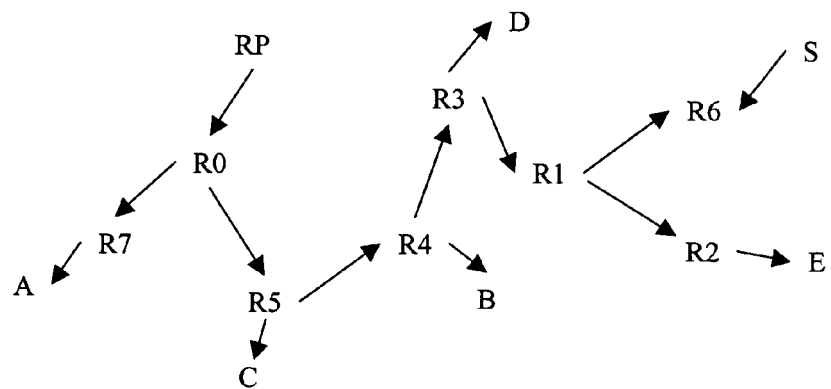
FIG. 4 is a diagram illustrating a tree building mechanism.
Figure 5:
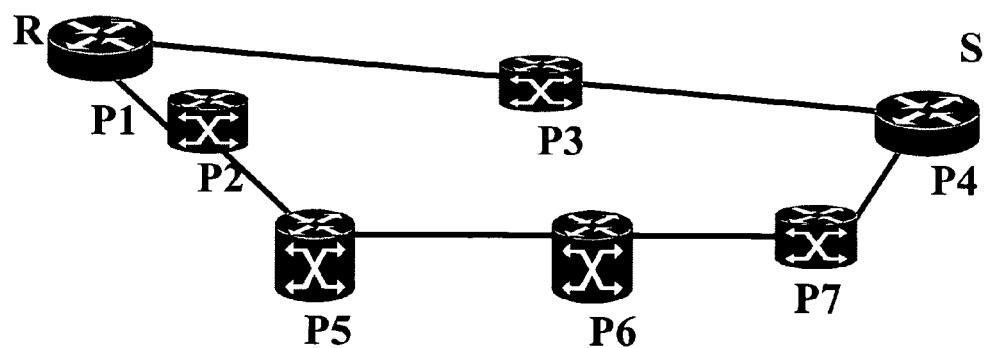
FIG. 5 is a simplified diagram illustrating the network shown in FIG. 3.

One way of implementing a Multicast system is to use a tree building protocol, for instance Protocol Independent Multicast (PIM). FIG. 4 illustrates the tree building mechanism of PIM. FIG. 4 shows an example of a Multicast group G of end nodes A, B, C, D and E and a network of routers R. To set up a multicast group, each member of the Multicast group A, B, C, D, E sends a join message to a central node known as the Rendezvous Point RP. In addition to the shared tree, rooted at the RP for this group G, routers may also join a (S,G) tree routed at S if, in their opinion, the volume of traffic from S makes it worthwhile. To prevent loops, with some nodes receiving traffic from S on the tree routed at RP and others receiving it on a tree routed at S, the shared tree is unidirectional. For a node other than RP to send a Multicast message on that tree, the data is tunneled to the RP before it can be Multicast to the nodes in the group G. This is achieved by the source S unicasting to RP by tunneling to RP. This is achieved by adding an IP header specifying the destination as the RP. The RP then sends it on the Multicast tree. In practice, in one approach, the RP is chosen in the following manner. Routers that are configured to be RPs unicast their ability to the ASBR 22 of the associated autonomous system. The ASBR then floods the identities of the RP candidates and the routers then decide which will be the RP by various means, for instance by applying a hash function that takes as input the group address G and the set of qualified candidate RPs and selects from that set the one that will be the RP for G. A group is then known by an 8-byte id of the form (source, G) where source identifies the source node and G defines the Multicast group.

To allow MVPN's to span multiple autonomous systems, the customer VPNv4 routes are advertised to each of the PE routers that has information about the VPN. Such routes are customer routes and do not belong to the provider. We call the routes VPNv4 routes.

The routes may be advertised using BGP and follow the complete path from one PE to the other. The BGP VPNv4 routes may be advertised with a Next-Hop (NH) attribute. This NH indicates via which router the route is reachable. These NH's are global routes belonging to the provider.

When a user wishes to join a multicast group, a device associated with the user obtains the source and group address. This may be achieved in many ways. One way is for a node to direct the user to an intranet page which includes the source and group address of the multicast group of interest. This information is then input to the user device. When a host joins a multicast group, the directly connected PE router sends a PIM join message toward the rendezvous point (RP). The RP keeps track of multicast groups. Hosts that send multicast packets are registered with the RP by the first hop router of that host. The RP then sends join messages toward the source. At this point, packets are forwarded on a shared distribution tree. If the multicast traffic from a specific source is sufficient, the first hop router of the host may send join messages toward the source to build a source-based distribution tree.

Figure 1:
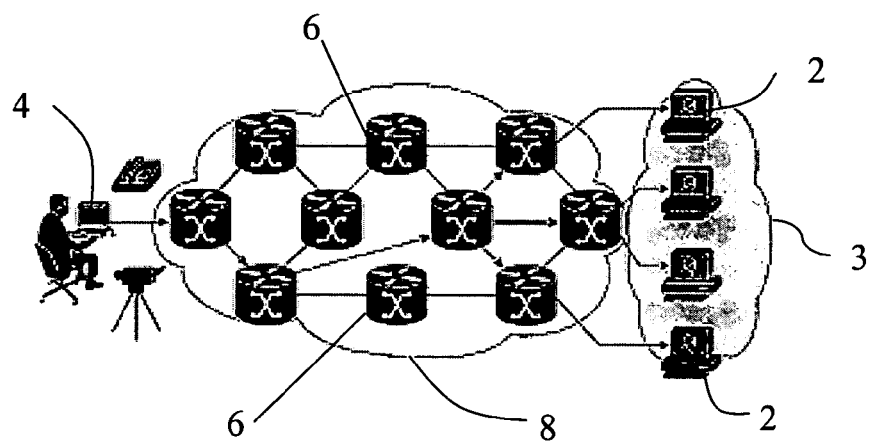
FIG. 1 is a diagram that illustrates IP Multicast.
Figure 2:
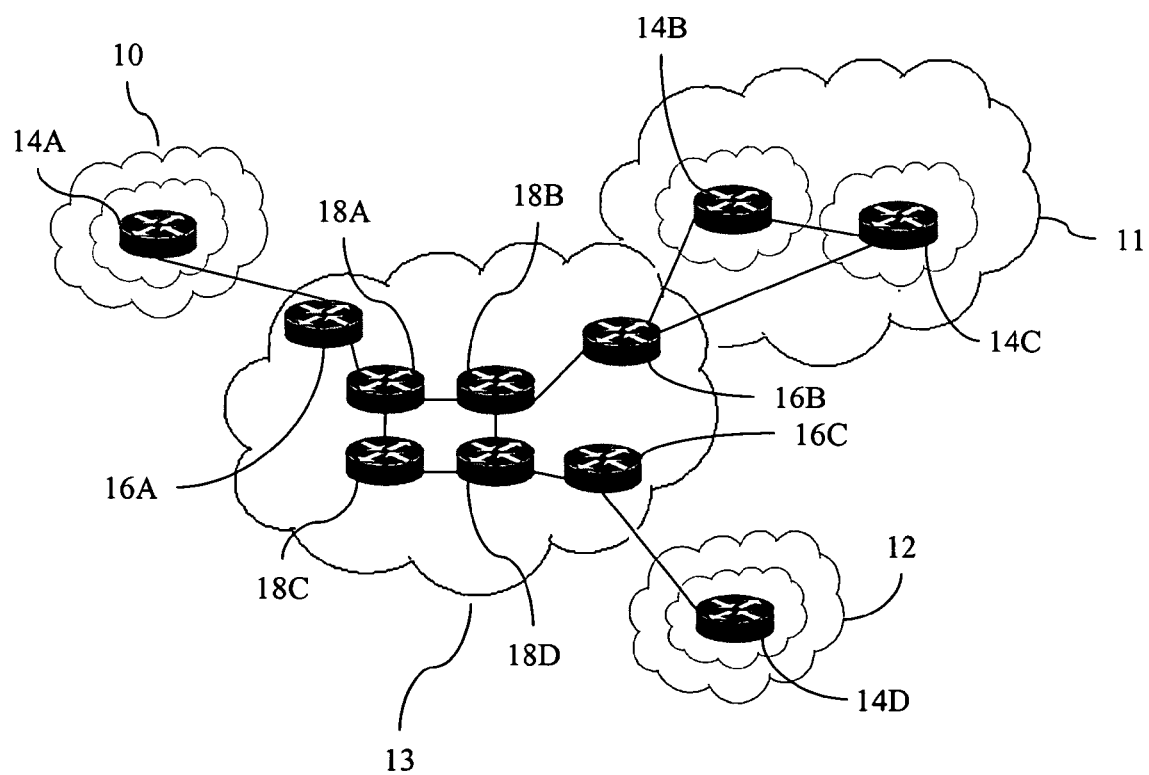
FIG. 2 is a diagram illustrating a VPN.

Thus when a host (attached to a CE device 14) wishes to join a multicast group, it sends a message which includes the multicast group and a source address (for instance obtained as described). This source is used by the receiving PE router to create a PIM join which is then sent to an upstream RP router. For a single autonomous system as shown in FIG. 2, say a host attached to the CE device 14D of VPN 12 wishes to join a Multicast group. The host sends a message (for instance using IGMP) to the CE router 14D. The CE router 14D then sends a message (e.g. a PIM message) to the PE router 16C with the group and the source address in it. Say that the router PE 16A is the Rendezvous Point for the group. The message sent by the CE device 14C therefore includes the group and the source address of the PE router 16A. The PE router 16C therefore receives the message from the CE device 14D and forms a PIM join message which is used to route the message to the source of the multicast group. This works within a single autonomous system. However, there are problems associated with establishing multicast via VPNs that employ more than one autonomous system, for instance the VPN shown in FIG. 3.

In this case, if PE router 16A is the Rendezvous Point for the Multicast group, RP is in a different AS from the sending router 14D. As addresses are not typically passed across AS boundaries, the PE device on one AS is unaware of the addresses for devices on another AS. The NH's of the VPNv4 routes are rewritten at the exit of the network (ASBR routers) and internal addresses are not advertised into the other AS. As a result, the VPNv4 becomes unreachable.

On a PE router, each VRF has its own multicast routing and forwarding database called MVRF. Each MVRF has its own Multicast Domain. Each multicast domain is assigned a distinct group address from a pool administered by the service provider(s). The group ranges used by these multicast domains are called MDT groups. A Multicast Tunnel is established between the two end-points of two Multicast VRFs on two PEs. The Multicast VPN traffic travels over these tunnels. The source addresses of these default tunnels are the local peering addresses used for BGP peering by the PE routers. This tunnel endpoint information is distributed by BGP.

To connect the MVPN's across autonomous systems, a MDT-default tunnel is set up between the two PE's. The PE's accomplish that by joining the configured MDT-default group. This MDT-default group is configured on the PE and unique per VPN. Both PE's know the MDT-default group address. In Source Specific Multicast (SSM) mode they also need to know the source address, which is an address configured on the PE. This information will be propagated by BGP.

There are two kinds of multicast tunnels that need to be established across a Provider's network to transit Multicast VPN traffic through the core. A VPN PIM Join Message coming from a CE triggers the establishment of these tunnels. The Multicast Default Tunnel is established as a result of the PE endpoints and the per-VRF default MDTs being exchanged in the core. This may be done via BGP. Once the CE sends a Join, it triggers the establishment of the Multicast Data Tunnels which get established and abolished on an as needed basis.

Multicast-capable VRFs have a unique default-MDT associated with each VRF on a PE. Sites belonging to the same VPN have the same default-MDT. A default-MDT tunnel is setup between the PEs (one per VPN). This default-MDT Tunnel is triggered by a PIM Join to the default-MDT Group address, which is sent to all the PEs that have the default-MDT configured on any of their attached VRFs. This information is advertised by those PEs to all the other routers in the core, for instance via BGP. When multicast trees are built using the MDT-default MVPN traffic traverses the MDT-default tunnel.

MDT-data trees are dynamically created for multicast streams in cases of high bandwidth groups.

For RPF checks in single-AS and Inter-Provider Scenarios, the PIM Join Message contains the Unicast address of the Upstream Neighbor to which the Join is being sent. RPF-lookups across autonomous systems, without having IPv4-unicast routing reachability to the destination PE (which may be in another AS), are not sufficient.

However, there is reachability to the BGP next hop of the BGP MDT update received in the MDT SAFI (Subsequent Address Family Identifier). So by including in the PIM Join both the remote PE's address (as advertised in the MDT SAFI) and the BGP next hop of this address as found in the MDT SAFI table, the RPF check requirement can be satisfied.

For the sake of explanation, let us call the remote PE's address in the PIM Join as "Upstream Neighbor Address" and the Next hop as found in the MDT table as "Upstream Next hop Address". On the PE originating the PIM Join to the default-MDT address, both of the above will be put in the PIM Join. When a P router receives the PIM Join, the P router carries out an RPF check on the Upstream Next hop address in the PIM join and sends the Join on to that address. When an ASBR receives this PIM Join and finds that the "Upstream Next hop Address" is its own, it finds the new "Upstream Next hop Address" by looking up the "Upstream Neighbor Address" in the MDT SAFI table. It carries out an RPF-checkup on the new "Upstream Next hop Address" and sends the Join to the next address.

"Upstream Neighbor Address" is found in the Unicast or the MDT SAFI table. This information may be included in the Join itself, to avoid multiple table-lookups.

Figure 6:
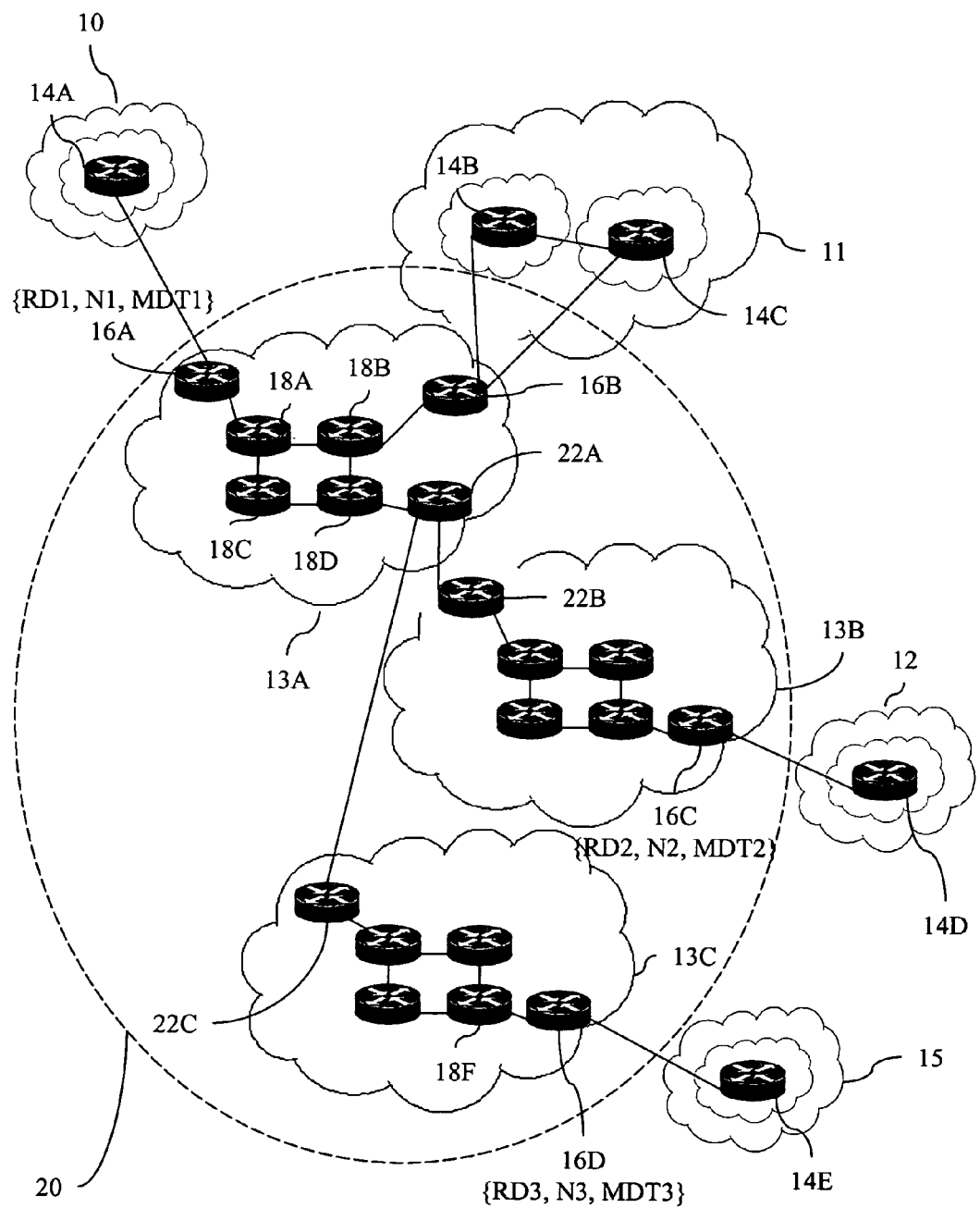
FIG. 6 is a diagram illustrating a second embodiment of a network.

Consider the topology shown in FIG. 6 in which three AS are shown, 13A, 13B and 13C. A PE router 16A in AS 13A has the MPVN attribute {RD1, N1, MDT1}, a PE router 16C in AS 13B has the MPVN attribute {RD2, N2, MDT2} and a PE router 16D in AS 13C has the MPVN attribute {RD3, N3, MDT3}, where RD is the route distinguisher of the VPN, N is the BGP Next hop and MDT is the MDT identifier. The autonomous systems are connected by ASBR1 22A in the first AS, ASBR2 22B in the second AS and ASBR 22C in the third AS. There may be one or more P routers 18 between the PE routers and the ASBRs. This may be schematically represented as follows:

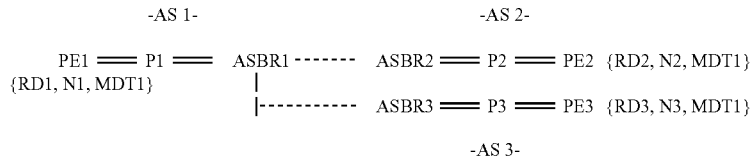

The operation of a method and apparatus for providing multicast messages across such a data communication network will now be described. PE1 16A advertises its MVPN attribute {RD1, N1, MDT1} as Network Layer Reachability Information (NLRI) in the BGP MDT SAFI to its BGP peers. It also advertises VPNv4 prefixes with a next hop and a Connector attribute containing the address N1. Similarly, PE2 16C & PE3 16D advertise their RD, MDT attribute and next hop bindings to their respective BGP peers. The three ASBRs 22A, 22B, 22C also exchange this information in the form of BGP Update Messages. ASBR1 22A propagates the information about {RD2, N2, MDT1} and {RD3, N3, MDT1} to PE1, 16A. On receiving this information, PE1 16A installs it in the BGP MDT SAFI table. Similarly, ASBR2 22B and ASBR3 22C also propagate the information about {RD1, N1, MDT1}) and {RD3, N3, MDT1}/{RD2, N2, MDT1} to PE2 16C and PE3 16D.

Now consider that ASBR2 and ASBR3 peer with each other and also exchange the MDT SAFI. ASBR2 then propagates {RD3, N3, MDT1} and ASBR3 also propagates {RD2, N2, MDT1} to ASBR1. ASBR1 then runs a best path algorithm based on BGP attributes contained in the BGP UPDATE Message and propagates this best path to PE1. PE1 then runs a best path algorithm and hands the information to PIM. PIM then triggers the setup of a tunnel.

Now consider a prefix belonging to VRF with RD2. The next hop for the VPNv4 advertisement, when advertised by PE2 16C, was N2. However by the time PE1 16A receives the advertisement, the next hop could be ASBR2 (assuming there is no next-hop-unchanged configuration done in AS2) or if ASBR1 does next-hop-self, then it will be ASBR1. The correlation between the next hop & the prefix may then be lost. So the original next hop may be preserved by carrying the original PE's address in a new attribute defined in BGP called the Connector attribute.

For the tunnel to be setup, the PIM Join from PE1 needs to be able to reach PE2 and PE3. This is trivial if PE1 has reachability to N2, N3 and PE2 and PE3 have reachability to N1, N3/N2. In the absence of this reachability, the MVPN requirements need the ability to do an RPF-check on the intermediate-hops. For example, PE1 16A does not know how to reach N2 on PE2 16C. However it does have reachability to the ASBR1 22A in its own AS 13A. So PE1 looks in its MVPN table for the next hop to be used for reaching {RD2, N2, MDT2} and it finds it to be ASBR1 (the BGP next hop received in the Update Message for the MDT SAFI). The PIM join is then sent by PE1 to ASBR1 22A. ASBR1 then looks into its MVPN table and finds the next hop for {RD2, N2, MDT2} to be ASBR2 22B and forwards the PIM Join to ASBR2. When the PIM join is received by ASBR2 22B, ASBR2 knows how to reach N2. Thus there is provided the ability to reach across ASs without having unicast reachability between them and the ability to do RPF-checks on the intermediate hops.

3.0 Method of Providing Multicast Messages Across a Data Communication Network

Methods of providing multicast messages across a data communication network will now be described with reference to a network as shown in FIG. 3 for illustrative purposes only. Thus, the methods described herein are applicable to a network of any other configuration. Nodes in the network (e.g. PE routers and ASBRs) exchange reachability information with other enabled devices in the network and store received reachability information as routing/forwarding instances (e.g. VRF) in the node. In the first instance, we will consider that a host connected to the CE device 14D wishes to join a multicast group.

Figure 7:
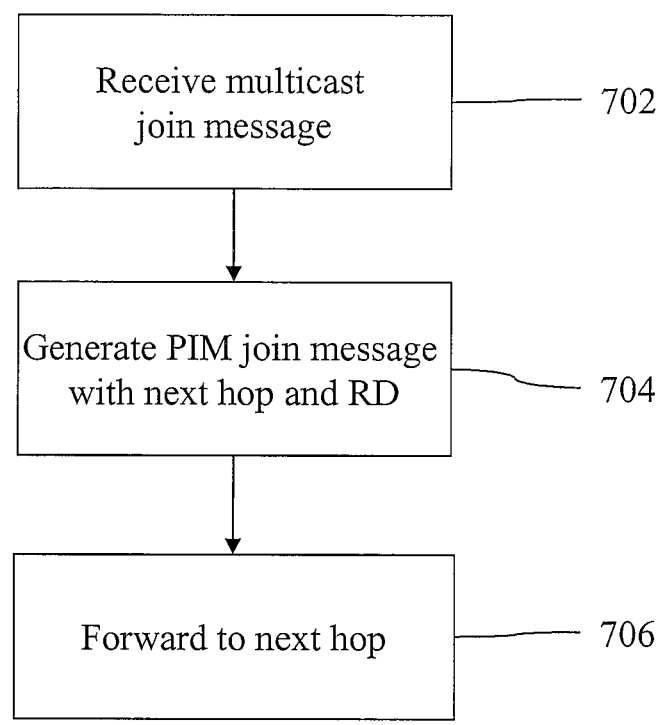
FIG. 7 is a flow diagram that illustrates a high level overview of one embodiment of a method at a PE router for providing multicast messages across a data communication network.

FIG. 7 is a flowchart illustrating an embodiment of a method at a PE router for providing multicast messages across a data communication network. PE router 16C receives a message (step 702) from CE device 14D that a host connected to the CE device wishes to join a multicast group. An example of such a message is of the form ip igmp join-group group-address. The PE router then generates (step 704) an adapted multicast join message with a next hop N, and RD and an MDT attribute, as discussed above. The PE router then (step 706) sends the multicast join message into the network to be forwarded to the address indicated in the Next hop.

Figure 8:
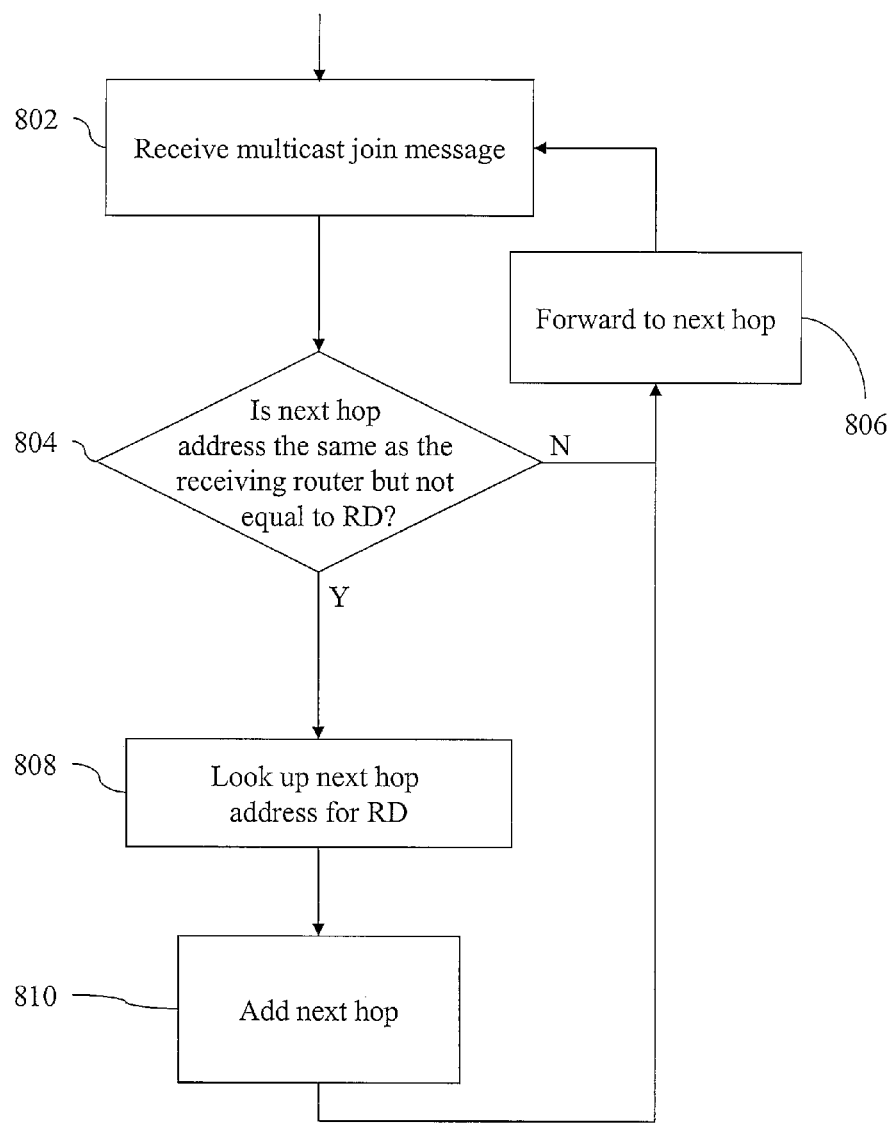
FIG. 8 is a flowchart illustrating an embodiment of a method for providing multicast messages across a data communication network.

FIG. 8 is a flowchart illustrating an embodiment of a method for providing multicast messages across a data communication network. The multicast join message generated by the initial PE router 16C is sent out into the network and is received by other nodes in the network (P routers, PE routers, ASBRs, etc). On receipt of a multicast join message (step 802), a node determines if the address of the Next hop is the same as the address of the receiving node (step 804). If this is not the case (for instance the receiving node is a P router) then the multicast join message is forwarded on through the network (step 806) using routing information at the node for the next hop.

If the address of the next hop of the Join message is the same as the address of the receiving node (step 804) (for instance, say the receiving node is ASBR router 22B), then the receiving node determines the next hop for the RD of the PIM Join. The receiving node forwards the multicast join message on through the network (step 806) towards the address now given by the new next hop, according to routing information at the node. These steps may be repeated many times in the network as the multicast join message is routed through the network before reaching the node determined by RD.

Thus a multicast join message having a source address S in a first AS is routed through a network comprising a plurality of AS. The source address may not be known to all routers in a network comprising a plurality of AS. Including the RD and the BGP next hop in the multicast join message allows the message to be routed through AS that do not know how to reach source S.

4.0 Implementation Mechanisms—Hardware Overview

Figure 9:
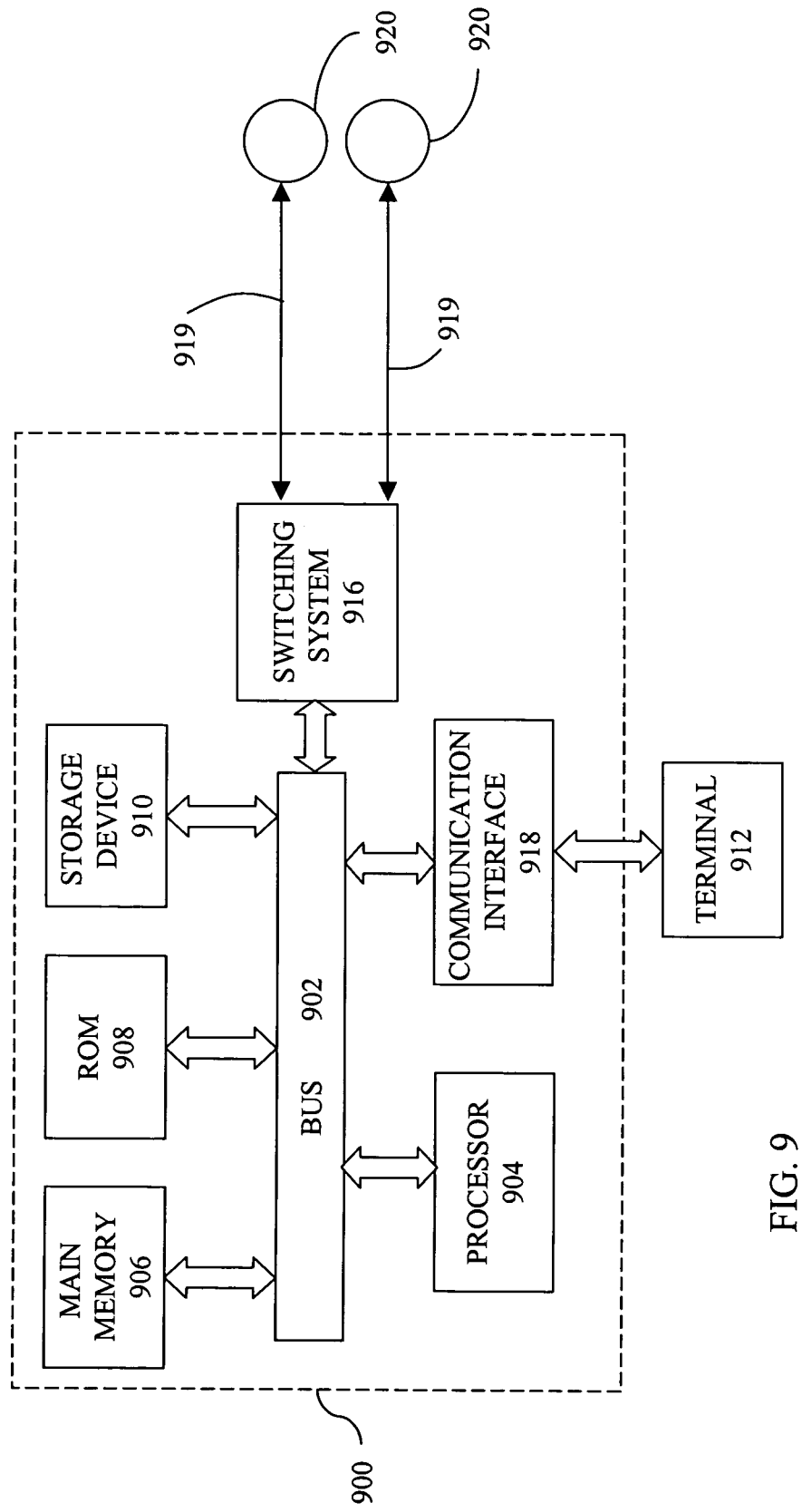
FIG. 9 is a block diagram that illustrates a computer system upon which an embodiment may be implemented.

FIG. 9 is a block diagram that illustrates a computer system 900 upon which the method may be implemented. The method is implemented using one or more computer programs running on a network element such as a router device. Thus, in this embodiment, the computer system 900 is a router.

Computer system 900 includes a bus 902 or other communication mechanism for communicating information, and a processor 904 coupled with bus 902 for processing information. Computer system 900 also includes a main memory 906, such as a random access memory (RAM), flash memory, or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, flash memory or optical disk, is provided and coupled to bus 902 for storing information and instructions.

A communication interface 918 may be coupled to bus 902 for communicating information and command selections to processor 904. Interface 918 is a conventional serial interface such as an RS-232 or RS-422 interface. An external terminal 912 or other computer system connects to the computer system 900 and provides commands to it using the interface 918. Firmware or software running in the computer system 900 provides a terminal interface or character-based command interface so that external commands can be given to the computer system.

A switching system 916 is coupled to bus 902 and has an input interface and a respective output interface (commonly designated 919) to external network elements. The external network elements may include a plurality of additional routers 920 or a local network coupled to one or more hosts or routers, or a global network such as the Internet having one or more servers. The switching system 916 switches information traffic arriving on the input interface to output interface 919 according to pre-determined protocols and conventions that are well known. For example, switching system 916, in cooperation with processor 904, can determine a destination of a packet of data arriving on the input interface and send it to the correct destination using the output interface. The destinations may include a host, server, other end stations, or other routing and switching devices in a local network or Internet.

The computer system 900 implements as a router acting as a node in the above described method generating routing information. The implementation is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906, from which processor 904 retrieves and executes the instructions. The instructions received by main memory 906 may optionally be stored on storage device 910 either before or after execution by processor 904.

Interface 919 also provides a two-way data communication coupling to a network link that is connected to a local network. For example, the interface 919 may be an integrated services digital network (ISDN) card or a modem to provide a data communication connection to a corresponding type of telephone line. As another example, the interface 919 may be a local area network (LAN) card to provide a data communication connection to a compatible LAN. Wireless links may also be implemented. In any such implementation, the interface 919 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 919, which carry the digital data to and from computer system 900, are exemplary forms of carrier waves transporting the information.

Computer system 900 can send messages and receive data, including program code, through the network(s), network link and interface 919. In the Internet example, a server might transmit a requested code for an application program through the Internet, ISP, local network and communication interface 918. One such downloaded application provides for the method as described herein.

The received code may be executed by processor 904 as it is received, and/or stored in storage device 910, or other non-volatile storage for later execution. In this manner, computer system 900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing multicast messages within a virtual private network across a data communication network, the method comprising the computer-implemented steps of:
   receiving a multicast join message at a first node on a first autonomous system;
   adding to the multicast join message a next hop address, an address of a router to which the multicast join message is to be sent, and a multicast distribution tunnel identifier;
   forwarding, using the multicast distribution tunnel identifier, the multicast join message to the next hop address of a second node on a second autonomous system;
   using the multicast distribution tunnel identifier, forwarding the multicast join message from the second autonomous system to the router on a third autonomous system;
   wherein the virtual private network comprises a multicast distribution tunnel that spans the first, the second and the third autonomous systems;
   wherein adding the address of the router to which the multicast join message is to be sent further comprises the step of adding to the multicast join message a Route Distinguisher for a multicast group, wherein the Route Distinguisher is to be used by an Autonomous System Boundary Router on the second autonomous system to identify another next hop address;
   wherein the Route Distinguisher is different from the multicast distribution tunnel identifier;
   wherein the method is performed by one or more processors.

2. A method as recited in claim 1, the network comprising at least two autonomous systems, wherein the step of adding the next hop address comprises the step of:
   adding to the multicast join message the address of an Autonomous System Boundary Router (ASBR).

3. A method according to claim 1 further comprising determining from forwarding information the address of the at least one router to be added to the multicast join message.

4. A method of providing multicast messages within a virtual private network across a data communication network, the method comprising the computer-implemented steps of:
   receiving at a first node of a first autonomous system of the network a multicast message having a multicast join message including a next hop address, an address of a router to which the multicast message is to be sent, and a multicast distribution tunnel identifier;
   reading the next hop address of the multicast message;
   when the next hop address of the multicast message corresponds to the address of the first node, determining, using the multicast distribution tunnel identifier, a new next hop of the router to which the multicast message is to be sent;
   repeating forwarding, using the multicast distribution tunnel identifier, as necessary until the multicast message is received by the router, on a third autonomous system, to which the multicast message is to be sent;
   wherein the new next hop of the router to which the multicast message is to be sent is a second node on a second autonomous system;
   wherein the data communication network comprises a multicast distribution tunnel that spans the first, the second and the third autonomous systems;
   wherein the address of the router to which the multicast message is to be sent further comprises a Route Distinguisher for a multicast group, wherein the Route Distinguisher is to be used by an Autonomous System Boundary Router on the second autonomous system to identify another next hop address;
   wherein the Route Distinguisher is different from the multicast distribution tunnel identifier;
   wherein the method is performed by one or more processors.

5. A method of providing multicast messages across a data communication network, the method comprising the computer-implemented steps of:
   receiving a multicast message at a first node on a first autonomous system;
   adding to the multicast message a next hop address, an address to a router to which the multicast message is to be sent, and a multicast distribution tunnel identifier;
   forwarding, using the multicast distribution tunnel identifier, the multicast message to the next hop address of a second node on a second autonomous system;
   using the multicast distribution tunnel identifier, forwarding the multicast message from the second autonomous system to the router on a third autonomous system;
   wherein the data communication network comprises a multicast distribution tunnel that spans the first, the second and the third autonomous systems;
   wherein adding the address of the router to which the multicast message is to be sent further comprises adding to the multicast message a Route Distinguisher for a multicast group, wherein the Route Distinguisher is to be used by an Autonomous System Boundary Router on the second autonomous system to identify another next hop address;
   wherein the Route Distinguisher is different from the multicast distribution tunnel identifier;
   wherein the method is performed by one or more processors.

6. A method according to claim 5 wherein the route distinguisher identifies a VPN.

7. A method of providing multicast messages across a data communication network, the method comprising the computer-implemented steps of:
   receiving a multicast message including a route distinguisher, a next hop address, an address of a router to which the multicast message is to be sent, and a multicast distribution tunnel identifier at a first node on a first autonomous system;
   looking up forwarding information for the route distinguisher and the next hop address;
   repeating forwarding, using the multicast distribution tunnel identifier, the multicast message to an address indicated in the forwarding information for the route distinguisher and the next hop address to a second node on a second autonomous system;
   using the multicast distribution tunnel identifier, forwarding the multicast message from the second autonomous system to the router on a third autonomous system;
   wherein the data communication network comprises a multicast distribution tunnel that spans the first, the second and the third autonomous systems;
   wherein the route distinguisher is to be used by an Autonomous System Boundary Router on the second autonomous system to identify another next hop address;
   wherein the route distinguisher is different from the multicast distribution tunnel identifier;
   wherein the method is performed by one or more processors.

8. A method of providing multicast messages within a virtual private network across a data communication network, the method comprising the computer-implemented steps of:
   receiving a multicast join message including a route distinguisher, a next hop address for a router to which the multicast join message is to be sent, and a multicast distribution tunnel identifier at a first node on a first autonomous system;
   forwarding, using the multicast distribution tunnel identifier, the multicast join message to an address indicated in forwarding information for the route distinguisher and the next hop address;
   reading the next hop address of the multicast join message;
   when the next hop address of the multicast join message corresponds to the address of a first node, determining, using the multicast distribution tunnel identifier, a new next hop for the route distinguisher of the multicast join message;
   repeating forwarding, using the multicast distribution tunnel identifier, as necessary until the multicast join message is received by a final address, on a third autonomous system, in the multicast join message;
   wherein the new next hop of the router to which the multicast join message is to be sent is a second node on a second autonomous system;
   wherein the virtual private network comprises a multicast distribution tunnel that spans the first, the second and the third autonomous systems;
   wherein the route distinguisher is to be used by an Autonomous System Boundary Router on the second autonomous system to identify another next hop address;
   wherein the route distinguisher is different from the multicast distribution tunnel identifier;

wherein the method is performed by one or more processors.

9. A non-transitory, computer-readable medium storing instructions which executed by one or more processors in a virtual private network, cause:
receiving a multicast join message including a route distinguisher, a next hop address, an address of a router to which the multicast join message is to be sent, and a multicast distribution tunnel identifier;
forwarding to a second node on a second autonomous system, using the multicast distribution tunnel identifier, the multicast join message to an address indicated in forwarding information for the route distinguisher and the next hop address;
reading the next hop address of the multicast join message;
when the next hop address of the multicast join message corresponds to the address of a receiving node, determining, using the multicast distribution tunnel identifier, a new next hop for the route distinguisher of the multicast join message;
repeating forwarding, using the multicast distribution tunnel identifier, as necessary until the multicast join message is received by a final address, on a third autonomous system, in the multicast join message;
wherein the virtual private network comprises a multicast distribution tunnel that spans the first, the second and the third autonomous systems;
wherein the route distinguisher is to be used by an Autonomous System Boundary Router on the second autonomous system to identify another next hop address;
wherein the route distinguisher is different from the multicast distribution tunnel identifier.

10. The non-transitory, computer-readable medium of claim 9, wherein the new next hop address is the address of an Autonomous System Boundary Router.

11. The non-transitory, computer-readable medium of claim 9, wherein the route distinguisher identifies a virtual private network.

12. An apparatus for providing multicast messages within a virtual private network across a data communication network, the apparatus comprising:
one or more processors;
a memory to store instructions, the instructions causing the one or more processors to cause:
receiving a multicast join message including a route distinguisher, a next hop address, an address of a router to which the multicast join message is to be sent, and a multicast distribution tunnel identifier at a first node on a first autonomous system;
forwarding, using the multicast distribution tunnel identifier, the multicast join message to an address indicated in forwarding information for the route distinguisher and the next hop address;
reading the next hop address of the multicast join message;
when the next hop address of the multicast join message corresponds to the address of a receiving node, determining, using the multicast distribution tunnel identifier, a new next hop for the route distinguisher of the multicast join message;
repeating forwarding, using the multicast distribution tunnel identifier, as necessary until the multicast join message is received by a final address, on a third autonomous system, in the multicast join message;
wherein the new next hop of the router to which the multicast join message is to be sent is a second node on a second autonomous system;
wherein the virtual private network comprises a multicast distribution tunnel that spans the first, the second and the third autonomous systems;
wherein the route distinguisher is to be used by an Autonomous System Boundary Router on the second autonomous system to identify another next hop address;
wherein the route distinguisher is different from the multicast distribution tunnel identifier.

13. The apparatus of claim 12, wherein the new next hop address is the address of an Autonomous System Boundary Router.

14. The apparatus of claim 12, wherein the route distinguisher identifies a virtual private network.

* * * * *